Aug. 15, 1961 G. KUHN 2,995,766
WINDSHIELD WIPER ASSEMBLY
Filed June 21, 1955
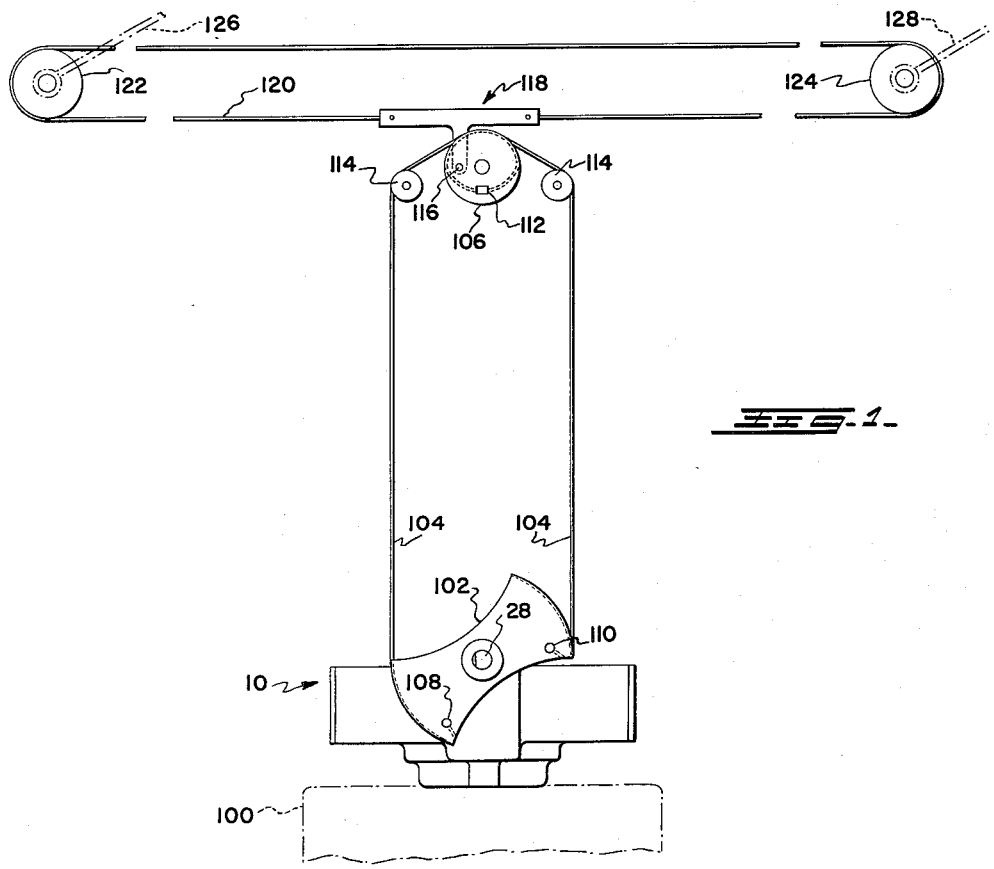
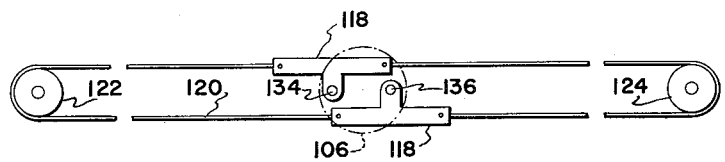
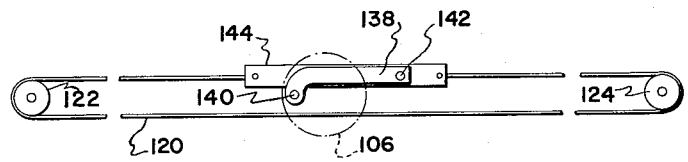
INVENTOR
GEORGE KUHN
BY Mead, Browne, Schuyler
& Beveridge
ATTORNEYS United States Patent Office 2,995,766
Patented Aug. 15, 1961

2,995,766
WINDSHIELD WIPER ASSEMBLY
George Kuhn, 16 Wessex Road, Silver Spring, Md.;
George C. Kuhn, executor of said George Kuhn, deceased
Filed June 21, 1955, Ser. No. 516,878
4 Claims. (Cl. 15—250.25)

This invention relates to fluid pressure operated devices and particularly to devices for operating automotive auxiliaries such as windshield wipers and the like. While the invention is adapted for operation by different types of fluid pressure operated motors, it will, by way of illustration only, be described in connection with a windshield wiper assembly operated by fluid pressure operated motor driven by hydraulic pressure supplied by the conventional oil pump of an internal combustion engine regardless of the type of vehicle to which the device is applied. For example, the vehicle could be an automobile, an airplane or a ship. This application is a continuation-in-part of my pending application Serial No. 214,660, entitled "Fluid Pressure Operated Motor," filed March 9, 1951, now Patent No. 2,722,919, granted November 8, 1955.

It is an object of the invention to provide a reciprocating fluid pressure motor adapted to drive an auxiliary device such as a windshield wiper, for example, with a harmonic motion.

It is still a further object of this invention to provide in combination with the fluid pressure motor in the first-described embodiment of the invention an apparatus external of the fluid pressure motor for converting the limited oscillatory angular movement at the output shaft of the motor to an angular movement of one-half revolution for use in providing harmonic motion to a driven device, such as a windshield wiper.

Other objects and advantages will appear from the following description when it is read in connection with the drawings in which:

FIG. 1 is a vertical elevation of a power transmission arrangement which may be used with a fluid pressure operated motor to supply a harmonic motion to apparatus driven by the fluid pressure motor, such as windshield wiper blades, for example;

FIG. 2 shows a modified drive connection between the auxiliary drive pulley of FIG. 1 and the drive cable for the windshield wiper blades, using a double pin drive;

FIG. 3 is a still further modified drive connection between the auxiliary drive pulley and the cable which drives the windshield wiper blades, using a single pin drive with a pivoted arm in the connection between the auxiliary pulley and the drive cable for the windshield wiper blades.

In the drawings, exemplary forms of the invention are disclosed for transmitting the output of a fluid pressure operated motor indicated generally at 10 in FIG. 1 to a pair of windshield wiper blades, partially indicated in broken lines at 126 and 128. Motor 10 preferably may take the form of a motor such as that described in my above Patent No. 2,722,919 which is driven by fluid pressure supplied by the oil pump of an internal combustion engine indicated in FIG. 1 at 100. Motor 10 drives an output shaft 28, in a manner described in detail in Patent No. 2,722,919, in motion which is substantially uniform in speed and power throughout the stroke of the motor. Under some circumstances, however, it is desirable to move windshield wiper blades with what is known as harmonic motion, such as is normally derived from rotating devices. The oscillatory angular movement of shaft 28 which moves through a limited angular movement, such as 70 degrees, for example, may be converted to a rotary movement of 180 degrees by the arrangement shown in FIG. 15.

The fluid pressure motor generally indicated at 10 is mounted on the engine 100 of the automotive vehicle in order to eliminate the need for flexible fluid supply connections between the fluid pressure motor 10 and the vehicle engine. Further details of the structure of motor 10 may be had by reference to my Patent No. 2,722,919. A yoke member 102 is rigidly mounted on the outer end of shaft 28 and oscillates through a limited angle such as 70 degrees in accordance with the oscillatory movements of shaft 28. Yoke member 102 is connected by means of a cable 104 to an auxiliary pulley 106 which is mounted on the bulkhead or partition which separates engine 100 of the automotive vehicle from the interior of the body of the vehicle. The ends of cable 104 are anchored at points 108 and 110 to the opposite ends of yoke 102. Cable 104 also passes through slots in auxiliary pulley 106 and is anchored thereto at point 112. Due to the cable connection 104 between yoke 102 and auxiliary pulley 106, the oscillatory movement of yoke 102 causes auxiliary pulley 106 to rotate back and forth through an arc of 180 degrees. The conversion of the limited angular movement of yoke 102 to a movement of 180 degrees of auxiliary pulley 106 is accomplished by proper proportioning of the diameters of yoke 102 and auxiliary pulley 106. Idler pulleys 114 maintain the opposite runs of cable 104 in parallel relation to prevent the lateral vibration of the engine 100 from affecting the tension of cable 104 or from affecting the smoothness of motion of the wiper blades.

Auxiliary pulley 106 is provided with an eccentrically mounted drive pin 116 to which is pivotally connected a T-shaped link generally indicated at 118 which includes a pair of aligned arms connected to the wiper blade drive cable 120. Drive cable 120 passes around oppositely disposed pulleys 122 and 124 to which are connected the windshield wiper blades 126 and 128.

As yoke member 102 rocks through its limited angle of oscillatory movement, auxiliary pulley 106 is rotated back and forth through an angle of 180 degrees and transmits a harmonic motion to windshield wiper blades 126 and 128 through connecting member 118 and drive cable 120.

As shown in FIG. 2, instead of using only a single connecting link 118 between cable 120 and auxiliary pulley 106, a pair of T-shaped connecting links 118 may be used. The two connecting links 118 of FIG. 1 are pivotally connected to oppositely disposed eccentric pins 134 and 136 on auxiliary pulley 106. The aligned arms of one of the links 118 are in line with and connected to the upper run of the cable 120 while the aligned arms of the other T-shaped link are in line with and connected to the lower run of the cable.

A still further modification of the connection between auxiliary pulley 106 and cable 120 is shown in FIG. 3 in which the auxiliary pulley 106 is connected to cable 120 by an L-shaped arm or link member 138 which is pivotally connected to an eccentric pin 140 on auxiliary pulley 106 and which is pivotally connected at its opposite end at point 142 to a link member 144 which is aligned with the upper run of cable 120 and connected to the opposite ends of the cable. Use of pivoted arm 138 maintains the upper and lower runs of the cable 120 parallel to each other at all times.

Instead of using a cable 120 and connecting links 118 or 138 to transmit the movement of auxiliary pulley 106 to windshield wiper blades 126 and 128, a conventional rigid connecting arm or pair of arms may instead be used, one end of each arm being connected to an eccentric driving pin carried by the auxiliary pulley while the opposite end of each connecting arm is connected to a pivotally movable windshield wiper blade.

It is to be unnderstood that the embodiments shown and described herein are merely illustrative of my invention and I do not limit myself except as determined in the following claims.

What I claim as my invention is:

1. A windshield wiper assembly comprising a power shaft, fluid preseure motor means for driving said power shaft in angular oscillation at a substantially uniform rate of speed, a motion transfer member mounted for rotation at a location spaced from said power shaft, drive means coupling said power shaft to said transfer member to rotate said transfer member at substantially uniform speed in angular oscillations having an amplitude of substantially 180° upon angular oscillation of said power shaft, a pair of windshield wiper blades mounted for rotation at spaced locations, means connecting said blades to each other to cause said blades to rotate in unison, said connecting means including a rigid member coupled to said connecting means to move in reciprocation when said blades are angularly oscillated, and a pin eccentrically mounted upon said transfer member and coupled to said rigid member to drive said rigid member in harmonic reciprocating motion upon angular oscillation of said transfer member at a substantially uniform speed.

2. A windshield wiper assembly comprising a power shaft, fluid pressure motor means for driving said power shaft in angular oscillation at a substantially uniform rate of speed, a motion transfer member mounted for rotation at a location spaced from said power shaft, drive means coupling said power shaft to said transfer member to rotate said transfer member at substantially uniform speed in angular oscillations having an amplitude of substantially 180° upon angular oscillation of said power shaft, a pair of windshield wiper blades mounted for rotation at spaced locations, a flexible drive member having its opposite ends interconnected by a rigid member located intermediate said spaced locations, means coupling each of said blades to said flexible drive member to convert harmonic reciprocatory movement of said rigid member into harmonic angular oscillation of said blades, and a pin eccentrically mounted upon said transfer member and coupled to said rigid member to drive said rigid member in harmonic reciprocatory movement upon angular oscillation of said transfer member at substantially uniform speed.

3. A windshield wiper assembly as defined in claim 2 including a drive link pivotally coupled at one end to said pin and pivotally connected at its other end to said rigid member.

4. A windshield wiper assembly as defined in claim 2 wherein said means coupling said shaft to said transfer member comprises a flexible member having opposed runs extending between said power shaft and said transfer member.

References Cited in the file of this patent
UNITED STATES PATENTS

| | | |
|---|---|---|
| 2,209,921 | Horton | July 30, 1940 |
| 2,241,766 | Coffey | May 13, 1941 |
| 2,272,033 | Buchmann | Feb. 3, 1942 |
| 2,302,232 | MacNeil | Nov. 17, 1942 |
| 2,316,070 | Horton et al. | Apr. 6, 1943 |
| 2,609,796 | Sivacek | Sept. 9, 1952 |
| 2,627,251 | Sprague et al. | Feb. 3, 1953 |
| 2,632,196 | Rappl | Mar. 24, 1953 |
| 2,651,802 | Kearful | Sept. 15, 1953 |
| 2,683,275 | Bitzer | July 13, 1954 |
| 2,716,252 | Mackie et al. | Aug. 30, 1955 |
| 2,722,919 | Kuhn | Nov. 8, 1955 |
| 2,745,130 | Oishei | May 15, 1956 |
| 2,760,221 | Hitzelberger | Aug. 28, 1956 |
| 2,840,844 | McLelland | July 1, 1958 |